(12) United States Patent
Schrader et al.

(10) Patent No.: US 8,278,785 B2
(45) Date of Patent: Oct. 2, 2012

(54) ELECTROMAGNETIC LINEAR MOTOR WITH STATOR HAVING CYLINDRICAL BODY OF MAGNETICALLY SOFT MATERIAL AND ROTOR HAVING AXIALLY-MAGNETIZED PERMANENT MAGNET

(75) Inventors: Stephan Schrader, Klein Machnow (DE); Kersten Zaar, Albstadt (DE)

(73) Assignee: viZaar industrial imaging AG, Albstadt (DE)

( * ) Notice: Subject to any disclaimer, the term of this patent is extended or adjusted under 35 U.S.C. 154(b) by 433 days.

(21) Appl. No.: 12/192,752

(22) Filed: Aug. 15, 2008

(65) Prior Publication Data

US 2009/0218892 A1 Sep. 3, 2009

(30) Foreign Application Priority Data

Aug. 16, 2007 (DE) .......................... 10 2007 038 862

(51) Int. Cl.
 *H02K 33/16* (2006.01)
 *H02K 35/02* (2006.01)
(52) U.S. Cl. ............... 310/12.24; 310/12.16; 310/12.25; 310/12.26

(58) Field of Classification Search ............... 310/12.16, 310/12.24
See application file for complete search history.

(56) References Cited

U.S. PATENT DOCUMENTS

| 5,231,336 | A | * | 7/1993 | van Namen | 310/12.25 |
| 5,360,445 | A | * | 11/1994 | Goldowsky | 623/3.22 |
| 5,896,076 | A | * | 4/1999 | van Namen | 335/229 |
| 6,184,597 | B1 | * | 2/2001 | Yamamoto et al. | 310/14 |
| 2002/0158727 | A1 | | 10/2002 | Namen | |
| 2006/0226713 | A1 | * | 10/2006 | Lehr et al. | 310/12 |

FOREIGN PATENT DOCUMENTS

| DE | 3717872 C2 | 12/1988 |
| DE | 19618355 A1 | 11/1997 |
| DE | 10323629 A1 | 10/2004 |

* cited by examiner

*Primary Examiner* — Quyen Leung
*Assistant Examiner* — Michael Andrews
(74) *Attorney, Agent, or Firm* — Collard & Roe, P.C.

(57) ABSTRACT

An electromagnetic linear motor is proposed that features a longitudinal stator, a hollow body of the stator made of a magnetically soft material, a magnetic coil of the stator, a rotor in the stator that is movable linearly relative to the magnetic coil, an axially magnetized permanent magnet of the rotor and an axially variable shape or variable magnetic material properties of the stator.

12 Claims, 2 Drawing Sheets

Figure 1:
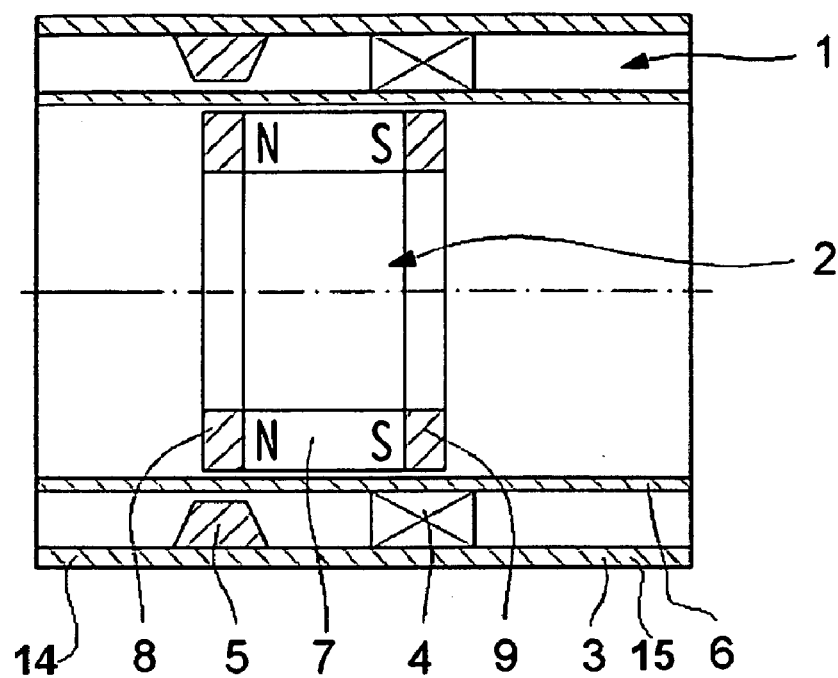

ELECTROMAGNETIC LINEAR MOTOR WITH STATOR HAVING CYLINDRICAL BODY OF MAGNETICALLY SOFT MATERIAL AND ROTOR HAVING AXIALLY-MAGNETIZED PERMANENT MAGNET

PRIOR ART

The invention concerns an electromagnetic linear motor that features a stator with at least one magnetic coil and a rotor with at least one permanent magnet.

In contrast to rotational drives, a linear motor displaces the object connected to it not in a rotational, but rather in a rectilinear motion, also known as a translational motion. The linear motor is equipped with a longitudinal stator and a rotor that is linearly displaceable relative to the stator. Either the stator or rotor features at least one magnetic coil. The part not equipped with a magnetic coil generally features a permanent magnet. In the stator, the rotor is excited to a translational motion by axially acting Lorentz or reluctance forces.

Linear motors of this type are used, for example, in compact optical systems for displacing the optical components such as lenses, prisms, mirrors, shutters, or CCD-chip. They thus find use in cameras, endoscopes and other optical instruments. Because of their area of application, linear motors must meet specifications that allow the components to be positioned as precisely as possible, enable positioning within the largest possible range, ensure that the beam path does not become obstructed during the displacement of components and, if possible, ensure that no—or at most only minor—heating occurs as a result of the heat energy released by the linear motor.

From the prior art, DE 37 17 872 C2 discloses an electromagnetic linear motor based on reluctance force with a continuously positionable rotor for use in optical systems. The stator is comprised of a soft iron tube in which two series-connected coils are arranged. Situated between the coils is a radially magnetized, ring-shaped permanent magnet. The rotor is equipped with two ferromagnetic tubes separated by a gap. When electrical current is absent, the reluctance forces cause the rotor to be situated in the symmetrical middle position in which the gap between the two ferromagnetic tubes lies opposite the center of the permanent magnet. Magnetic resistance is lowest at this position. If current flows through the two coils, the rotor moves axially in a direction which is a function of the greatest force exerted upon it. The disadvantage of this linear motor is that the stator, which is equipped with two coils and a permanent magnet, is not of compact construction and therefore cannot be employed in optical systems possessing the smallest possible external dimensions. A further disadvantage is that the magnet is magnetized radially so that in order to extend the magnetic field in the direction of the field the diameter of the motor must be increased.

DE 196 18 355 A1 discloses an endoscope with an electromagnetic linear motor based on the moving coil principle. In this example, the tubular stator is equipped with a bifilar coil. A sleeve gliding in the stator features a permanent magnet with axial magnetization. When current flows through the bifilar coil, the permanent magnet is acted upon by magnetic forces that cause the permanent magnet to accelerate radially. The disadvantage here is that it is not possible to definitively set or ascertain the position of the permanent magnet with the aid of the linear motor alone. To determine position, it is necessary to equip the linear motor with an additional sensor. Furthermore, if it is intended that the permanent magnet, stop at a prescribed position, it is necessary to surround the linear motor with a servo-loop.

DE 103 23 629 A1 discloses an electromagnetic traveling-field linear motor featuring a stator with at least three magnetic coils. Each of the three magnetic coils is supplied with current, resulting in a phase shift of 120° between each of the three phases. Although this linear motor allows the rotor position to be definitively set and ascertained, the disadvantages are its high current and voltage consumption as well as its large size. The size is predetermined by the length of the stator with the three magnetic coils and cannot be reduced as desired.

The object of the invention is to provide an electromagnetic linear motor that allows the rotor to be precisely positioned anywhere along a displacement path, functions with a single-phase electrical control, can be miniaturized for use in endoscopes, has a small axial length in relation to its diameter and, furthermore, can be manufactured economically.

THE INVENTION AND ITS ADVANTAGES

The advantage of the inventive linear motor with the features in accordance with the invention over the linear motors from prior art is that the stator is equipped with a cylindrical body of a magnetically soft material, the form of which varies axially. Running axially through the hollow body is a hollow space, the cross section of which also varies axially. The cylindrical body additionally features a segment at each of its ends, referred to as first and second segment. Provided between these two segments is at least a third segment of the hollow body in which the cross section of the hollow space is smaller than in the first and second segments. The hollow body additionally features, for instance, one or more segments projecting in the direction of the rotor that, at least segmentally, reduce the distance between the magnetically soft hollow body of the stator on one end and the rotor on the other end. This configuration of the stator causes the magnetic resistance of a magnetic circuit, which is comprised of the magnetic coil of the stator, the permanent magnets of the rotor and sections of the soft magnetically soft hollow body, to vary with the axial position of the rotor. In the process reluctance forces are generated in axial direction, which force the rotor into a stable preference position. When no current flows through the magnetic coil, the permanent magnet assumes whichever axial position in which the magnetic resistance is the lowest and the axial reluctance force is zero. The rotor is thus always in a position close to the third segment, for instance, in the axial center of the hollow body. This position when no current is flowing through the magnetic coil is significant. There is only one position of this type. It can be referred to as the starting position. If, on the other hand, current flows through the magnetic coil, the reluctance force and additionally acting Lorentz force override one another. This causes the permanent magnet to be deflected, whereby the direction of deflection is determined by the direction of the electrical current and amount of deflection is a function of electrical current strength. In this way, there is a direct correlation between the position of the rotor and the amount of the electrical current flowing through the magnetic coil. The electrical current strength is low so that the Lorentz force and reluctance force cancel out one another at a position of the rotor within the stator. Deliberate effort is made to prevent a situation in which the Lorentz force is greater than the reluctance force, because this would preclude an exact and reproducible positioning of the rotor as a function of electrical current strength. Because of the low electrical current strength, there is no—or at most a very minor—heating of the linear motor.

The permanent magnet can hence be positioned continuously and precisely if friction is disregarded. The rotor assumes a stable resting position at the particular axial position in which reluctance force and Lorentz force cancel one another out. This position is determined by the electrical current strength. The holding force resulting from reluctance force and Lorentz force stabilizes the rotor in its position so that this position is maintained even under the influence of external forces. The linear motor can thus be turned or shaken without causing the rotor to change its resting position.

The inventive linear motor allows the rotor to precisely adjust itself relative to the stator in any desired position. This means that not just individual discrete adjustments or stepwise displacement are possible in the prescribed range of positions.

The inventive linear motor is distinguished by its simple construction involving a minimal number of components. This in turn facilitates low manufacturing and assembly work and expenses and, at the same time, gives the linear motor a compact size. It is thus suited for use in small optical systems, such as endoscopes for example. Depending on application scenario a small construction length of the linear motor suffices. In contrast to the multiple-phase traveling field linear motors, a single voltage phase is sufficient for supplying current to the magnetic coil.

The curve of reluctance force as a function of the axial position of the permanent magnet is influenced by the geometrical shape of the stator and by local magnetic material properties of the stator. The Lorentz force is essentially determined by the coil. If the parameters are appropriately set, it is possible to achieve a nearly linear relationship between the position of the permanent magnet and electrical current strength.

The coil is preferably made of insulated copper wire. It can either be wound around a coil body or be manufactured as a self-bearing coil of black enameled copper wire. The latter embodiment is advantageous particularly for miniaturizing the linear motor, since it eliminates the winding body and the space required for it. Alloys with maximum energy density such as neodymium-iron-boron or samarium cobalt, for example, are suitable materials for the permanent magnets to be used in compact drives. The components that serve to guide the magnetic flow, such as the stator for example should preferably be made of magnetically soft material with high magnetic permeability and saturation. Depending on geometrical size and configuration, materials such as simple structural steel up to ferromagnetic alloys with defined magnetic characteristics can be employed.

In an advantageous configuration of the invention, the magnetic coil is arranged at the first or second segment of the cylindrical hollow body. If applicable, it can also be located on other segments of the hollow body, in which the cross section of the hollow space is smaller than that in the third segment. In all of the cases described above, the magnetic coil is not in the third segment and thus has no influence on the tapering of the cross section of the hollow space in the third segment.

In another advantageous configuration of the invention, the magnetically soft, cylindrical hollow body is designed as a tube with a circular cross section and is preferably referred to as a stator backing tube. The permanent magnet is preferably also of cylindrical form. This rotationally symmetrical design has the advantage of an especially compact size and optimal guidance of the permanent magnet functioning in the stator as the rotor. The optical components or other parts are advantageously arranged in a hollow space of the permanent magnet. In this way, they are protected by the permanent magnet and stator from the effects of outside forces.

In another advantageous configuration of the embodiment, the third segment of the cylindrical hollow body features a ring-shaped stator terminal shoe that is arranged so that it is spaced axially in relation to the magnetic coil on the inside of the cylindrical hollow body or is designed as a single piece together with the hollow body. The stator terminal shoe extends in axial direction further into the hollow space than the remaining surface of the cylindrical hollow body facing the hollow space. The stator terminal shoe thus forms a prominence on the inside of the hollow body. The prominence designed as a round bulge or provided with edges features, for instance, a semicircular, rectangular, trapezoidal, or triangular cross section. Instead of a continuous ring, individual ledges or segments separated from one another can be provided. The stator terminal shoe can either be designed as one piece together with the hollow body or inserted into the hollow body as a separate part.

In another advantageous configuration of the invention, the stator backing tube and the ring-shaped stator terminal shoe are arranged coaxially to one another. Together they form a rotationally symmetrical unit.

In another advantageous configuration of the invention, the stator terminal shoe is made of a magnetically soft material. In this way it is easily magnetized together with the magnetically soft hollow body by the magnetic field of the magnetic coil and the permanent magnet and intensifies the external magnetic fields by the factor of material permeability. The magnetic resistance is thereby reduced. It is advantageous if the stator terminal shoe is made of the same material as the cylindrical hollow body.

In another advantageous embodiment of the invention, the third segment features greater magnetic permeability than that of all other segments of the hollow body, particularly that of the first and second segments of the hollow body. The magnetic resistance is thereby further minimized when no current is running through the magnetic coil.

In another advantageous configuration of the invention, a jacket tube made of a non-ferromagnetic material is arranged in the hollow space of the hollow body. The windings of the magnetic coil are wound around this jacket tube. The jacket tube accommodates the permanent magnet and guides its axial movement. This prevents the permanent magnet from becoming tilted at the magnetic coil forming a prominence or at the stator terminal shoes. The stator terminal shoe is preferably arranged between the hollow body and the jacket tube. In this way, the stator terminal shoe fills the hollow space between the hollow body and jacket tube at least partly and thereby bridges the air gap between the hollow body and the jacket tube.

In another advantageous configuration of the invention, magnetically soft rotor terminal shoes are arranged on the rotor. They are preferably located at the axial ends of the permanent magnet of the rotor. The rotor terminal shoes help facilitate an efficient use of the electromagnetic field generated by the magnetic coil.

In another advantageous configuration of the invention, the rotor is equipped with a second permanent magnet with axial magnetization. This contributes to increased Lorentz force.

In another advantageous embodiment of the invention, the rotor features an axially running hollow space for accommodating parts such as optical components for instance. This hollow space can be located in the permanent magnet, for instance. The permanent magnet is therefore preferably ring-shaped or tubular.

The inventive linear motor with the features described in a further embodiment has the advantage that the stator is equipped with a cylindrical body made of a magnetically soft material, the magnetic material properties of which vary axially. For this purpose, at least three segments of the hollow body are provided: a first and a second segment each located at the end of the hollow body and a third segment between the first and second segment. This third segment has greater magnetic permeability than all of the other segments of the cylindrical hollow body. In this way, the magnetic resistance of a magnetic circuit, which is comprised of the magnetic coil of the stator, the permanent magnets of the rotor and segments of the soft magnetically soft hollow body, is varied axially with the position of the rotor. The reluctance forces are thereby generated in axial direction, which force the rotor into a stable preference position. When no current flows through the magnetic coil, the permanent magnet assumes that axial position in which the magnetic resistance is the lowest and the axial reluctance force is zero. The rotor is thus always in a position close to the third segment, for instance, in the axial center of the hollow body. This position which is assumed whenever current is not running through the magnetic coil is significant. There is only one such position. It can be referred to as the starting position. If, on the other hand, current flows through the magnetic coil, the reluctance force and additionally acting Lorentz force interfere with one another. This causes the permanent magnet to travel, whereby the direction of travel is determined by the direction of the electrical current and the amount of travel is a function of the electrical current strength. In this way, there is a direct correlation between the position of the rotor and the electrical current strength of the magnetic coil. The electrical current strength is low so that the Lorentz force and reluctance force cancel out one another at a position of the rotor within the stator. Deliberate effort is made to prevent a situation in which the Lorentz force is greater than the reluctance force, since this would preclude an exact and reproducible positioning of the rotor as a function of electrical current strength. Because of the low electrical current strength, there is no-or at most only a very minor-heating of the linear motor.

The features of the electromotor drive, which include a tapering cross section in the third segment, can be advantageously combined with the variable magnetization.

Additional advantages and advantageous embodiments of the invention are illustrated herein.

DRAWINGS

Figure 2:
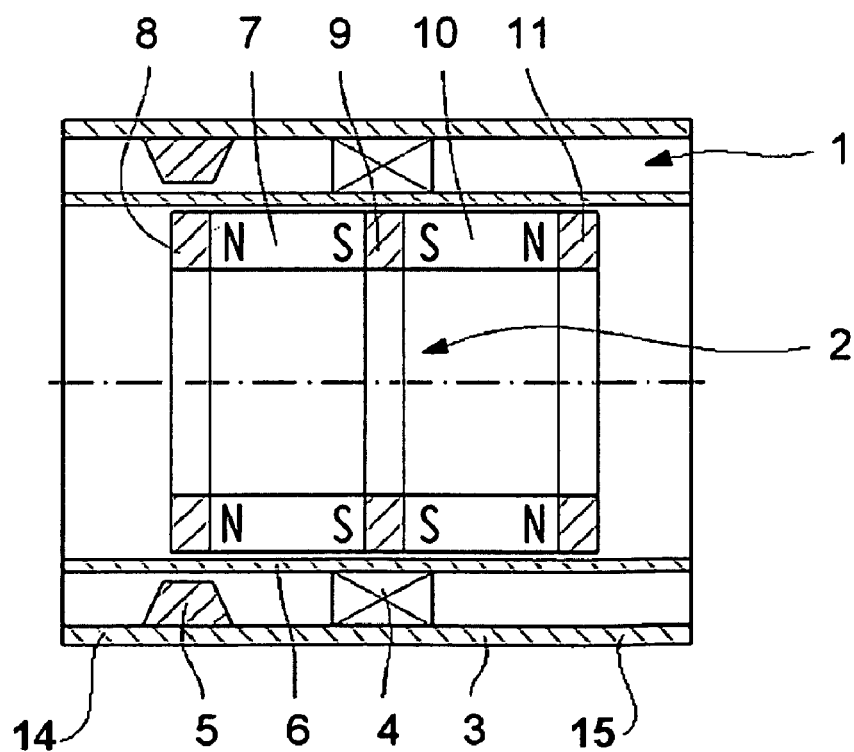
Figure 3:
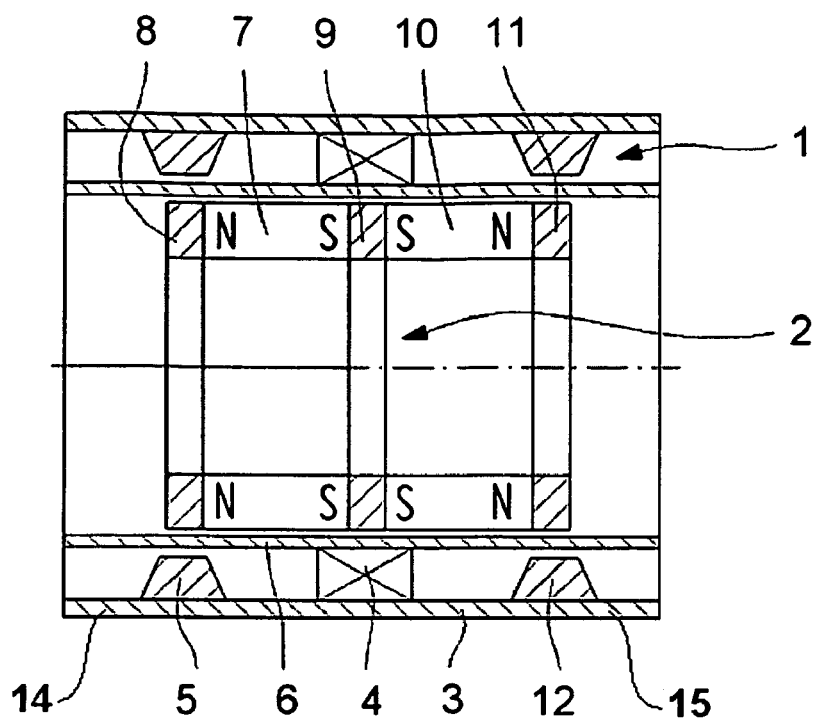
Figure 4:
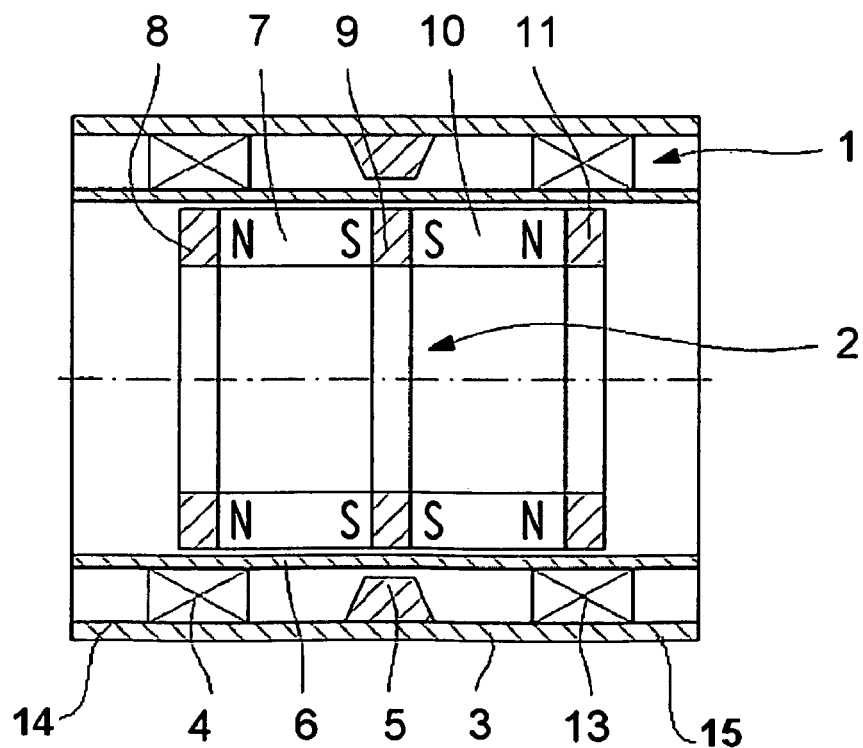

The drawings illustrate multiple embodiments of an inventive linear motor. Shown are:

FIG. 1 a longitudinal section of a first embodiment of a linear motor,

FIG. 2 a longitudinal section of a second embodiment of a linear motor,

FIG. 3 a longitudinal section of a third embodiment of a linear motor,

FIG. 4 a longitudinal section of a fourth embodiment of a linear motor.

DESCRIPTION OF THE EMBODIMENTS

FIG. 1 is longitudinal cross section of a first embodiment of a linear motor. The sectional plane runs through the center of the linear motor. The linear motor is comprised of a stator 1 and a rotor 2. The stator 1 is equipped with a magnetically soft, cylindrical hollow body hereinafter referred to as stator backing tube 3. The stator also features a magnetic coil 4, a stator terminal shoe 5, and a jacket tube 6. Stator backing tube 3 and stator terminal shoe 5 are made of the same magnetically soft material. The windings on the magnetic coil 4 wind around the jacket tube 6, which is made of a non-ferromagnetic material. The stator terminal shoe 5 forms a ring and has a trapezoidal cross section. It touches the stator backing tube 3 and is spaced apart from the jacket tube 6. The rotor 2 features a permanent magnet 7 and rotor terminal shoes 8 and 9, which are arranged on the axial ends of the permanent magnet. The two rotor terminal shoes 8 and 9 are also made of a magnetically soft material.

The permanent magnet 7 is magnetized axially. In the drawing, its north pole is labeled N, while its south pole is labeled S. The magnetic circuit in the linear motor emanates from the north pole of the axially magnetized permanent magnet 7 and runs through the left rotor terminal shoe 8 via a small radial air gap in the stator terminal shoe 5 and the stator backing tube 3, from there into the ring-shape magnetic coil 4 via the right rotor terminal shoe 9 and into the south pole of the permanent magnet 7. Each air gap within the magnetic circuit acts as magnetic resistance. Resistance increases with the length of the air gap. The rotor 2 is thus oriented in the stator 1 such that the air gap within the magnetic circuit is as small as possible to reduce the magnetic resistance and attain the most energetically favorable state. What are known as reluctance forces trigger the attraction of the end surfaces of magnetically conductive materials, which include an air gap. FIG. 1 illustrates the most energetically favorable state of the rotor 2, provided that no current is flowing through the magnetic coil 4. The rotor 2 is in the stable starting position in which it is driven by the reluctance force. If, in contrast, current flows through the magnetic coil, a Lorentz force acts in addition to the reluctance force and causes the rotor 2 to travel out of the starting position. The rotor is displaced so far axially until the reluctance force and Lorentz force cancel one another out. Reversing the direction of electrical current flow causes the rotor 2 to travel in the opposite direction. As soon as the current is switched off, the rotor 2 returns to the stable starting position illustrated in FIG. 1. The distance by which the rotor 2 is moved out of its starting position is a function of electrical current strength. Varying the electrical current strength of the magnetic coil thus allows any desired axial position of the rotor to be set within a prescribed displacement path. As long as the electrical current strength remains unchanged, the rotor 2 remains in its associated position. The position remains stable even under the influence of external forces.

FIG. 2 is a sagittal or longitudinal cross section of a second embodiment of a linear motor. This linear motor differs from the first embodiment in that it features a second axially magnetized permanent magnet 10 and a third rotor terminal shoe 11. The second permanent magnet 10 is polarized in the opposite direction as that of the first permanent magnet 7. If permanent magnets 7 and 10 are of the same size, then a magnetic flow approximately double that running through the two outer terminal shoes 8 and 11 runs through the middle terminal shoe 9. While the magnetic flow through the stator terminal shoe 5 and thus also the reluctance force remain nearly unchanged, the Lorentz force is nearly doubled compared to that of the linear motor of the first embodiment. A further increase can be achieved through an additional magnetic coil, which in the starting position illustrated in FIG. 2 is positioned at the level of the third rotor terminal shoe 11. This is not illustrated in the drawing, however.

FIG. 3 shows a third embodiment of a linear motor. This one is essentially identical to the second embodiment illustrated in FIG. 2. Unlike the second embodiment, the third embodiment features the addition of a second stator terminal shoe 12 that has the same axial spacing from the magnetic coil 4 as the first stator terminal shoe 5. However, it is situated on the side of the magnetic coil 4 facing away from the first stator terminal shoe 5. The additional stator terminal shoe 12 increases the reluctance force. The same applies for a design with two magnetic coils positioned around a centrally arranged stator terminal shoe. This fourth embodiment is illustrated in FIG. 4. The second magnetic coil is labeled with the reference number 13.

What all four embodiments have in common is that the stator backing tube 3 features a first segment 14 and a second segment 15 running axially at both of its ends, the inner diameters of which are greater than the inner diameter of the stator terminal shoe 5 and the stator terminal shoe 12. The stator terminal shoe 5 forms the third segment of the stator backing tube 3. The stator terminal shoe 12 in the third embodiment constitutes a fourth segment, which has this same characteristic found in the third segment. The smaller inner diameter of the stator terminal shoe results in a smaller cross section of the hollow space of the stator backing tube 3 in the third and fourth segment.

All features of the invention can be fundamental to the invention both on their own and in any desired combination.

REFERENCE NUMBER LIST

1 Stator
2 Rotor
3 Stator backing tube
4 Magnetic coil
5 Stator terminal shoe
6 Jacket tube
7 Permanent magnet
8 Rotor terminal shoe
9 Rotor terminal shoe
10 Second permanent magnet
11 Rotor terminal shoe
12 Second stator terminal shoe
13 Second magnetic coil
14 First segment of the stator backing tube
15 Second segment of the stator backing tube

The invention claimed is:

1. An electromagnetic linear motor comprising:
a longitudinal stator comprising:
a cylindrical hollow stator body made of a magnetically soft material and having a first end, a first segment extending from the first end, a second end facing away from the first end, a second segment extending from the second end, and a third segment directly connected to the first segment and directly connected to the second segment,
a hollow space running axially through the cylindrical hollow stator body, and
a single magnetic coil connected to the cylindrical hollow stator body on an inside of the cylindrical hollow stator body facing the hollow space, the single magnetic coil having windings including an electrical conductor of the hollow space, and
at least one rotor linearly movable in the stator and comprising an axially magnetized permanent magnet,
wherein the first segment and the second segment of the cylindrical hollow stator body limit an equally large or differing cross section of the hollow space,
wherein the third segment extends into the hollow space,
wherein all cross sections of the hollow space limited by the cylindrical hollow stator body in the third segment are smaller than all of the cross sections of the hollow space in the first segment and are smaller than all of the cross sections of the hollow space in the second segment,
wherein the single magnetic coil is the sole magnetic coil connected to the cylindrical hollow stator body on the inside of the cylindrical hollow stator body, and
wherein the third segment is the sole segment directly connected to the first and second segments that extends into the hollow space.

2. The electromagnetic linear motor as claimed in claim 1, wherein the single magnetic coil is arranged on the first or second segment of the cylindrical hollow stator body.

3. The electromagnetic linear motor as claimed in claim 1, wherein the cylindrical hollow stator body is designed as a stator backing tube with a circular cross section.

4. The electromagnetic linear motor as claimed in claim 1, wherein the third segment of the cylindrical hollow stator body features a ring-shaped stator terminal shoe arranged to be spaced axially in relation to the single magnetic coil on the inside of the cylindrical hollow stator body.

5. The electromagnetic linear motor as claimed in claim 4, wherein the cylindrical hollow stator body is designed as a stator backing tube with a circular cross section, and
wherein the tube and the ring-shaped stator terminal shoe are arranged coaxially.

6. The electromagnetic linear motor as claimed in claim 4, wherein the ring-shaped stator terminal shoe is made of a magnetically soft material.

7. The electromagnetic linear motor as claimed in claim 1, wherein the first segment has a first magnetic permeability,
wherein the second segment has a second magnetic permeability,
wherein the third segment has a third magnetic permeability, and
wherein the third magnetic permeability is greater than the first magnetic permeability and is greater than the second magnetic permeability.

8. The electromagnetic linear motor as claimed in claim 1, further comprising a jacket tube arranged in the hollow space of the cylindrical hollow stator body,
wherein the windings of the single magnetic coil are wound around the jacket tube, and
wherein the jacket tube is made of a non-ferromagnetic material.

9. The electromagnetic linear motor as claimed in claim 1, wherein the at least one rotor is equipped with magnetically soft rotor terminal shoes.

10. The electromagnetic linear motor as claimed in claim 9, wherein the magnetically soft rotor terminal shoes are arranged at axial ends of the rotor.

11. The electromagnetic linear motor as claimed in claim 1, wherein the at least one rotor is equipped with a second permanent magnet with axial magnetization.

12. The electromagnetic linear motor as claimed in claim 1, wherein the at least one rotor features an axially running hollow space for accommodating parts.

* * * * *